(No Model.) 2 Sheets—Sheet 1.
H. C. EARLE.
GAS HEATER.
No. 491,045. Patented Jan. 31, 1893.
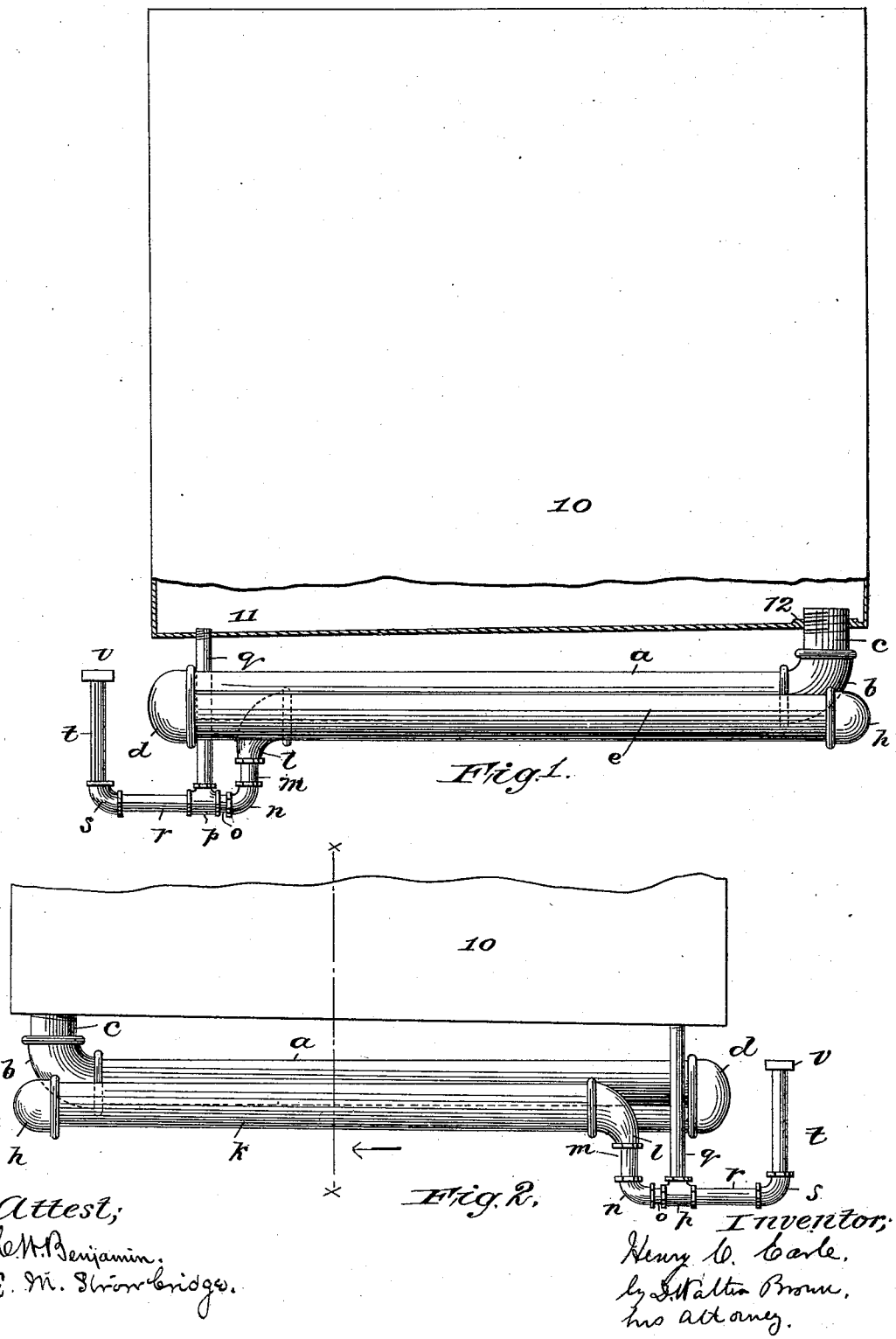

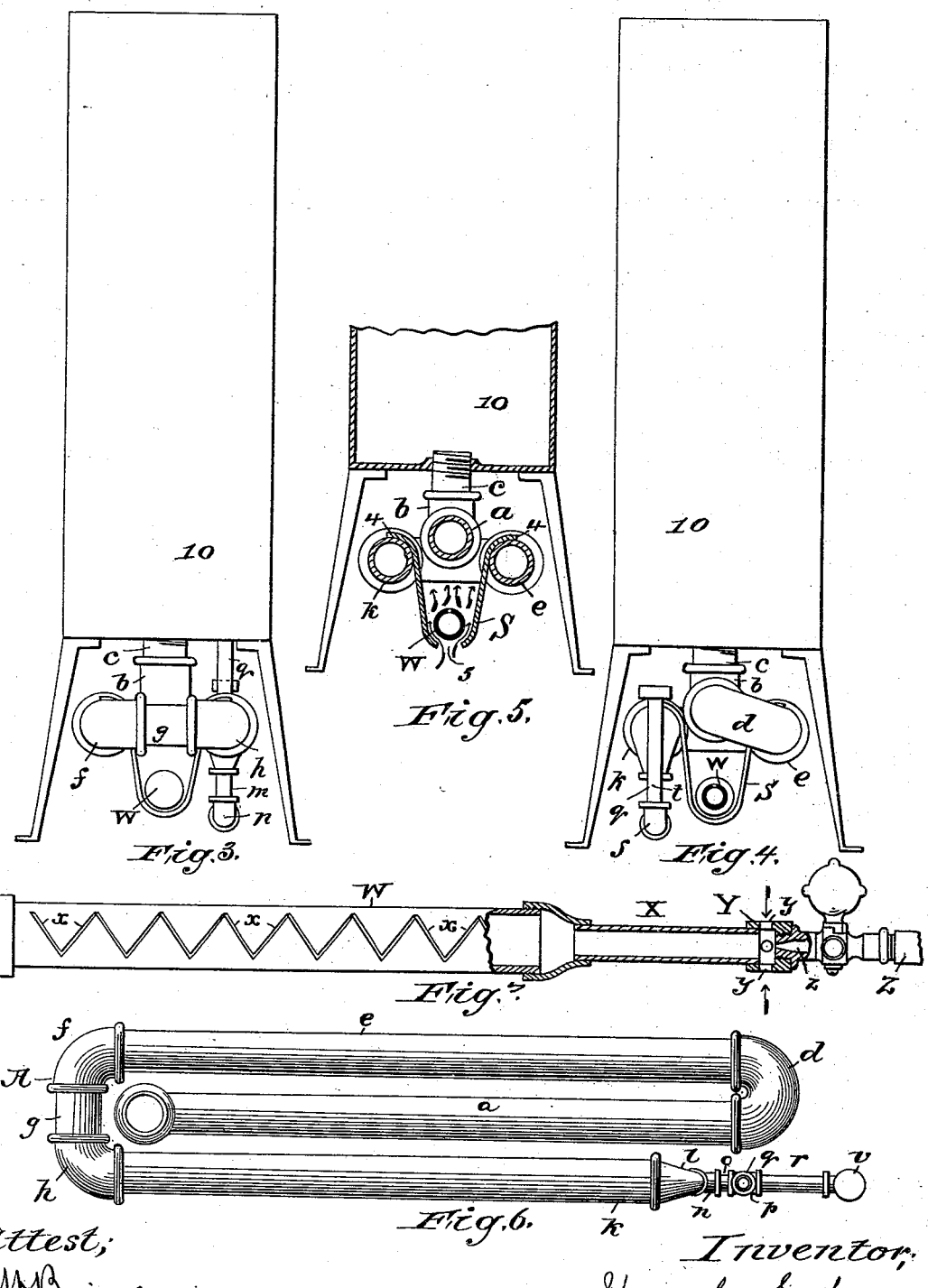

UNITED STATES PATENT OFFICE.

HENRY C. EARLE, OF NEW YORK, N. Y.

GAS-HEATER.

SPECIFICATION forming part of Letters Patent No. 491,045, dated January 31, 1893.

Application filed February 29, 1892. Serial No. 423,299. (No model.)

*To all whom it may concern:*

Be it known that I, HENRY C. EARLE, a citizen of the United States of America, residing at New York, in the county and State of New York, have invented certain new and useful Improvements in Gas-Heaters, of which the following is a specification.

My invention relates to improvements in hydro carbon water and steam heaters, and particularly such as employ the flame of a Bunsen gas burner as the heating agent.

The purpose of my improvement is first to form my heater so that only a part of the whole volume of water shall receive all the heat of the gas flame, for the purpose of very quickly vaporizing the water, and thereby soon heating the radiator, which is connected with the heater; second to arrange a water reservoir or reservoirs so as to gradually feed the heater, as water is evaporated therefrom, and maintain the water level in the heater always constant, whereby the most efficient and economical development of steam is promoted, and to do this without any cumbersome and complicated system of valves. I accomplish these results by so forming the heater and the reservoirs that they altogether constitute one continuous series, the reservoirs discharging water from one into the other and thence into the heater, and the said heater being so situated as to be directly exposed to the burner-flame, while the said reservoirs are so situated as not to be exposed to the burner-flame. This is effected by organizing the whole as a pipe coil whereof the one leaf or length constitutes the heater, and the others the water reservoirs. The heater length is placed about one half its diameter above the water reservoir lengths, which are on a level with each other. The steam supply pipe is connected with the heater length and the condensation ultimately returns to one of the water reservoirs. Between the latter and the burner is interposed a shield, or deflector, perforated to admit air to the burner. By this arrangement the flames of the burner are concentrated upon the heater length of the coil, and the first evaporation reduces the water level in that length to the top of the water reservoirs; thereby leaving a space in the top of the heater, to act as a steam space and facilitate the ready development of steam. The water level in the heater can never fall lower because as rapidly as evaporation takes place water enters the heater from the reservoirs, and since the condensation returns to the reservoirs no waste takes place, except the little from the air valve or pet cock when the radiator is first being heated; and the operation continues for an indefinite time without lowering the water level in the heater or requiring any attention.

Finally my improvement provides a very compact efficient and cheap heating apparatus.

Now referring to the drawings which accompany the specification to aid the description.—Figure 1 is a broken side elevation of the heater attached to radiator. The deflector or shield and the burner are not shown. Fig. 2 is a broken elevation of the side opposite to that shown in Fig. 1. The same parts are seen. Fig. 3 is a broken end elevation, showing also the deflector and burner. Fig. 4 is a broken elevation of the end opposite to that shown in Fig. 3. The same parts are seen. Fig. 5 is a cross section of the apparatus on the line *x x* of Fig. 1. Fig. 6 is a plan view of the heater and reservoirs. Fig. 7 is a plan view of the burner.

A is the combined heater and reservoirs which are formed into a continuous connecting series in the following manner: The heater proper, *a*, is a length of pipe, of suitable diameter, and having at one end a bend, *b*, turned upward into which is threaded the steam supply pipe *c*, for connection with a radiator. At the end opposite to the bend, *b*, the pipe *a*, has a return bend, *d*, into which is threaded a pipe, *e*, preferably of the same diameter as heater, *a*. The return bend *d*, is inclined as seen in Fig. 4, so that the pipe *a*, shall be about one half its diameter above the pipe, *e*, (Figs. 3, 4, 5.) The pipe *e*, is just long enough to clear the bend, *b*, and has a quarter bend, *f*, into which is threaded a nipple, *g*, and this into a quarter bend, *h*, into which finally is threaded a pipe *k* of same diameter as pipes *e*, and placed at the same level, but preferably considerably shorter. The end of pipe *k*, opposite to the bend, *h*, is connected with a reducing elbow, *l*, turned downward, and the elbow with a short vertical pipe, *m*, which descends nearly to the floor level and to a quarter bend, $n$. With this bend $n$ is connected a horizontal pipe, $o$, with T, $p$, from which rises the drip pipe, $q$, by which the condensation returns to the water reservoir. It is evident that the dropping of the pipe $o$, below the pipe $k$, and the rising again of the drip pipe $q$, forms a trap, which I believe to be very useful to secure the movement of the steam in its proper direction toward and up the steam pipe, $c$, and prevent its possibly working along pipe, $k$, and ascending the drip pipe $q$. Beyond the T, $p$, is a length of horizontal pipe, $r$, with quarter bend, $s$, turned up and into which is threaded a vertical pipe, $t$, which rises just to the top of the heater pipe, $a$, and is capped with a screw cap, $v$, as seen. The pipe, $t$, is the "filler."

Now from the foregoing description it is evident that I have organized a heater, $a$, and water reservoirs, $e$, and $k$, into one continuous connecting series, and that the water in heater, $a$, can never fall below the level of the water reservoirs $e$ and $k$, since from the arrangement of the apparatus there must be a continual feed from pipes $e$ and $k$ into pipe $a$. Below the pipe $a$, and parallel therewith is placed a Bunsen burner W, of special design. I form it of a length of pipe of suitable diameter closed at one end and having its top sawed into diagonal slits $x$. $x$ as seen in Fig. 7. The other end of the pipe W, connects with a short pipe X and this with a section of pipe or a ring, Y, of somewhat larger diameter than the pipe W. The periphery of this ring, Y, is perforated with holes, $y$, $y$, as shown. Opposite to the pipe, W, the said ring Y, is connected with the needle tip $z$ of the gas pipe, Z. When gas is turned on air is drawn through the holes, $y$, $y$, into the pipe, X (which pipe I term the mixing chamber) where the air and gas are mixed, and whence the admixture passes to the aforesaid burner, W, escaping thence through the diagonal slits, $x$, $x$, which spread the flame all around the lower part of the heater pipe $a$. Below the burner, W, and up between said burner W, and the water reservoirs, $e$ and $k$, is placed a shield or deflector of sheet metal, S, bent to a semi-elliptical shape, as seen, and having flaring upper edges, 4, 4, which rest on the pipes, $e$, $k$. The said deflector, S is of about the same length as the burner W, is open at both ends and also at the top, and is slotted at the bottom by the long slot, 5, which is directly under the gas-burner, W, and is intended to admit air to the burner. For this purpose the deflector, S will be raised a little above the floor. The said deflector, S, performs the two-fold function of keeping the flame away from the water reservoirs, $e$ and $k$, and concentrating it for the heater, $a$, and the air supplying opening, 5, being directly below the burner, W, is of greater utility to promote the combustion and direct the flame against the heater pipe $a$, than if said opening 5 were in the side of the deflector, or than if the air which passed down over the top of the said deflector were relied on to promote combustion. Also I find such a deflector, which flares away from the flame at the top to be more efficacious than a chamber which should encircle the burner on all sides.

I prefer to organize my heater hereinbefore described with a radiator in the following manner: The radiator 10 is cast as a hollow box, in the manner known to iron founders, and with a boss 12 on its bottom at about the middle of its width, but near one end, which boss, 12, is threaded to receive the threaded end of the steam pipe, $c$, which projects a little above the boss, 12 as seen, in order to prevent the condensed water from running back into pipe C. Near the other end and at one side, there is a threaded hole, 11, in the bottom of the said radiator, 10, which receives the threaded end of the drip pipe, $g$, and the said radiator, 10 is cast with its bottom graded from the boss 12, to the drip pipe orifice 11, so that the condensed water shall run down to the said drip pipe and return to the water reservoirs. Now the apparatus is filled with water through the filler, $t$, until the water level is up to the top of heater pipe, $a$, somewhat above the tops of reservoir pipes $e$ and $k$, which will be known by water beginning to run over the top of the filler $t$. Then the cap, $v$, is put on the filler, $t$, and the gas turned on and ignited at the burner W. By reason of the deflector S, the flames are caused to impinge directly on the heater pipe, $a$, and the water quickly begins to be evaporated. The first steam enters and warms the radiator 10 and the water level in the heater, $a$, falls until it descends to a level with the top of the reservoirs $e$ and $k$. After that it cannot fall farther, because as water evaporates in heater, $a$, it enters from pipe, $e$, which in turn draws water from pipe $k$, and the condensed water is all the time returning by the drip pipe $g$, to the reservoir pipes $e$ and $k$. But by the lowering of the water level in the heater pipe, $a$, there is formed a steam space in the said pipe $a$, above the surface of the water, which materially assists in the free development of the steam and thereafter, as said, this steam space always remains constant, or nearly so.

Evidently I might form the heater and reservoir pipes $a$, $e$, $k$ by bending one long piece of pipe, and without the elbows and bends, but I believe it is preferable, on account of cheap and ready construction to use straight pipes $a$, $e$, $k$, and unite them by bends in the manner indicated in the drawings. In case it becomes necessary to increase the heating surface of the pipe $a$, considerably, then I may add additional lengths to the coil A, and have more than one length in contact with flames as a heater, but whatever the arrangement may be, the heater pipes and the water reservoirs will still form one continuous connected series.

Now having described my improvement I claim as my invention,

1. In a gas heater, the combination of a hydro carbon gas burner, and a water heater consisting of a pipe coil, whereof one length is directly exposed to the action of the gas flames and is at a higher level than the other lengths, which said other lengths form water reservoirs that are connected in series with the first named length and with each other.

2. In a gas heater, the combination of a hydro carbon gas burner, a boiler exposed to the direct action of the gas flame, water reservoirs at a lower level than the boiler and operatively connected therewith, and a deflector interposed between the burner and the reservoirs.

3. In a gas heater, the combination of a hydro carbon gas burner, boiler and water reservoirs in a continuous connecting series, and the boiler at a higher level than the reservoirs, a deflector interposed between the burner and the reservoirs, a filler at a level with the top of the boiler and connected with the reservoirs, and a radiator operatively connected with the boiler and also with the reservoirs.

4. In gas heaters, and in combination with a hydro-carbon gas burner, a heater consisting of a boiler and reservoirs arranged in a continuous connecting series, and the boiler being at a higher level than the reservoirs, a steam supply pipe from the boiler, and a drip pipe trapped below the water reservoirs and operatively connected therewith.

In witness whereof I have hereunto set my hand, this 15th day of September, 1891, in the presence of two witnesses.

HENRY C. EARLE.

Witnesses:
LOUIS M. FULTON,
CHAS. S. LONGHURST.